(12) United States Patent
Kaul et al.

(10) Patent No.: US 8,668,824 B2
(45) Date of Patent: Mar. 11, 2014

(54) RAPID CYCLE REFORMING PROCESS

(75) Inventors: Bal K. Kaul, Fairfax, VA (US); Abhash Nigam, Centreville, VA (US); Jasmina Poturovic, Vienna, VA (US); Mohsen N. Harandi, Calgary (CA); Stuart S. Goldstein, Southampton (GB)

(73) Assignee: ExxonMobil Research and Engineering Company, Annandale, NJ (US)

( * ) Notice: Subject to any disclaimer, the term of this patent is extended or adjusted under 35 U.S.C. 154(b) by 369 days.

(21) Appl. No.: 12/946,317

(22) Filed: Nov. 15, 2010

(65) Prior Publication Data

US 2011/0147267 A1 Jun. 23, 2011

Related U.S. Application Data

(60) Provisional application No. 61/283,543, filed on Dec. 4, 2009.

(51) Int. Cl.
*C10G 35/04* (2006.01)

(52) U.S. Cl.
USPC .............................. 208/134; 208/133; 208/135

(58) Field of Classification Search
USPC ......................................... 208/100, 133–135
See application file for complete search history.

(56) References Cited

U.S. PATENT DOCUMENTS

| | | | |
|---|---|---|---|
| 3,558,479 A | 1/1971 | Jacobson et al. | |
| 3,716,477 A | 2/1973 | Jacobson et al. | |
| 3,859,201 A | 1/1975 | Wilhelm | |
| 4,129,497 A * | 12/1978 | Tamm | 208/138 |
| 5,203,966 A | 4/1993 | Carlson et al. | |
| 5,885,439 A * | 3/1999 | Glover | 208/64 |

* cited by examiner

*Primary Examiner* — Randy Boyer
*Assistant Examiner* — Juan Valencia
(74) *Attorney, Agent, or Firm* — David M. Weisberg

(57) ABSTRACT

This invention relates to process for producing a reformate or gasoline product. The process involves a rapid cycle of reacting hydrocarbon feedstock to form the product and then regenerating the catalyst used in the reaction. The process can be carried out at relatively high liquid hourly space velocities and preferably at relatively low hydrogen to hydrocarbon ratios to produce a reformed product having relatively high liquid yield and hydrogen content.

20 Claims, No Drawings

RAPID CYCLE REFORMING PROCESS

This application claims the benefit of U.S. Application No. 61/283,543, filed Dec. 4, 2009, which is hereby incorporated by reference herein in its entirety.

FIELD OF THE INVENTION

This invention relates to a reforming process for producing a gasoline product. In particular, this invention relates to a reforming process that incorporates a rapid cycle of reacting hydrocarbon feedstock to form the product and then regenerating the catalyst used in the reaction.

BACKGROUND OF THE INVENTION

Catalytic reforming is a refinery process used to improve octane quality of liquid hydrocarbons such as naphthas or straight run gasolines. Reforming can be considered as changing the molecular structure of various hydrocarbons in a hydrocarbon feedstock to produce a reformed product. Such change is generally carried out by combinations of chemical reactions involving dehydrogenation, dehydrocyclization, isomerization, and hydrocracking of the various hydrocarbons. The reformed product is typically referred to as reformate.

The reforming process is carried out using a reforming catalyst, which becomes coked as the process is carried out. A multifunctional catalyst is usually employed, which contains a metal hydrogenation-dehydrogenation (hydrogen transfer) component or components.

Reforming reactions are both endothermic and exothermic. Endothermic reactions are generally predominant, particularly in the early stages of reforming.

Numerous reactor arrangements have been designed to accommodate the complex of endothermic and exothermic reactions that take place. These arrangements typically fall into three major categories: semi-regenerative, cyclic, and continuous. Fixed bed reactors are typically employed in semi-regenerative and cyclic reforming. Moving bed reactors are typically employed in continuous reforming.

In semi-regenerative reforming, the entire reforming process unit is operated by gradually and progressively increasing the temperature to compensate for deactivation of the catalyst caused by coke deposition. As catalyst activity becomes undesirably reduced due to the coke deposition, the entire unit is shut down for regeneration and reactivation of the catalyst.

In cyclic reforming, multiple reactors are in series and the reactors are individually isolated such that catalytic reforming or catalyst regeneration can be carried out as desired in any individual reactor. In effect, one or more reactors can be swung out of line by various piping arrangements to carry out the reforming and regeneration reactions at the same time or in unison. The "swing reactor," in essence, temporarily replaces an on-line reactor, so that the coked catalyst can be regenerated in the swing reactor, while reforming of the hydrocarbon feed continues in the on-line reactor. Once regeneration is complete, the swing reactor can then be rotated back into service.

In continuous reforming, the reactors are typically moving bed reactors. In a moving bed reactor, reforming catalyst is continuously added and withdrawn. The catalyst that is withdrawn is regenerated in a separate vessel and then returned to the moving bed reactor.

A variety of process variables have been utilized to improve reformate product quality, such as $C_{5+}$ liquid yield and/or octane quality. For example, if a product of high octane is desired, e.g., 100 or higher RON (research octane number), it has been typical to obtain such a product by increasing space velocity and/or reaction temperature. However, changing these variables in such a way often results in reducing the desired yield of $C_{5+}$ components in the product, as well as in decreasing the activity of the catalyst at a faster rate due to enhanced coke formation on the catalyst during the reaction process.

U.S. Pat. No. 5,203,966 discloses a process for catalytically reforming a gasoline boiling range feedstock described as resulting in a significantly higher yield of $C_{5+}$ liquid product, as well as hydrogen, as a percent of the naphtha feedstock. The reforming process is carried out in multiple stages, with an aromatics-rich (high octane) stream being separated between stages. The separation is performed after reforming at low severity, in a first stage or set of stages, to convert most of the alkylcyclohexanes and alkylcyclopentantes to aromatics with minimum cracking of paraffins.

U.S. Pat. No. 3,716,477 discloses a reforming process in which a naphtha feed is reformed to produce a high octane gasoline product. The process is carried out at a pressure from 20-100 psig (140-690 kPag), a hydrogen or hydrocarbon mole ratio of less than 2, and a liquid hourly space velocity of 0.5-5, using a catalyst comprising platinum and rhenium supported on a porous inorganic oxide carrier. The reforming process is periodically discontinued to permit regeneration of the catalyst to restore substantially its initial activity.

Nevertheless, there is still much room for improving the reforming process. In particular, higher octane reformate is desired with increased demand for yield. Achieving higher yields of such product, while being able to more adequately control coke build-up and producing increased quantities of hydrogen as an additional product, is of particular demand. Sources of additional hydrogen are also in demand, to enable refineries to produce higher yields of higher quality fuels lower in sulfur components.

SUMMARY OF THE INVENTION

This invention provides reforming processes for enhanced production of gasoline product, i.e., reformate, as well as providing for additional hydrogen production. The processes are particularly suited to cyclic reforming.

According to one aspect of the invention, there is provided a reforming process for producing a gasoline product. The process comprises injecting a hydrocarbon feedstock and hydrogen into a reforming reactor containing reforming catalyst at reforming conditions that include a liquid hourly space velocity of greater than about 5 $hr^{-1}$. Preferably, the hydrocarbon feedstock can be injected into the reforming reactor at a hydrogen to hydrocarbon mole ratio of not greater than about 1 to produce the gasoline product.

In one embodiment, injection of the hydrocarbon feedstock and hydrogen into the reforming reactor can be ceased at a time of not greater than about 100 hours. The catalyst in the reforming reactor can be regenerated once injection of the hydrocarbon feedstock and hydrogen have ceased, and injection of the hydrocarbon feedstock and hydrogen into the reforming reactor containing the regenerated catalyst can then be continued.

In one embodiment, the reforming conditions can further include maintaining the reforming reactor at an average pressure of not greater than about 100 psig (about 690 kPag) during injection of the hydrocarbon feedstock and the hydrogen. Preferably, the reforming reactor can be maintained at an average pressure of not greater than about 60 psig (about 410 kPag) during injection of the hydrocarbon feedstock and the hydrogen.

In one embodiment, the liquid hourly space velocity is at least about 10 hr$^{-1}$. Preferably, the hydrogen to hydrocarbon mole ratio can be not greater than about 0.5.

In another embodiment, injection of the hydrocarbon feedstock and hydrogen into the reforming reactor can be ceased at a time of not greater than about 50 hours.

In yet another embodiment, regeneration can be carried out for a time less than that of reaction time.

Preferably, the reforming process can be a cyclic reforming process. Also preferably, the reforming reactor can be a fixed bed reactor.

In another embodiment, the reforming catalyst can include a structural support having an average particle diameter of not greater than about 500 microns. Preferably, the reforming catalyst can comprise platinum and one or more of rhenium and tin.

In one embodiment, the reforming catalyst can include a structural support comprised of alumina, silica, titania, magnesia, zirconia, chromia, thoria, boria, or a mixture thereof. Preferably, the reforming catalyst can include a crystalline silicate structural support.

In a particular embodiment, the hydrocarbon feedstock exhibits initial and final ASTM boiling points in the range from about 20° C. to about 260° C.

In another embodiment, the hydrocarbon feedstock can be pretreated to reduce sulfur content.

DETAILED DESCRIPTION OF THE EMBODIMENTS

This invention provides a reforming process for producing a gasoline product, as well as increased hydrogen production. The process involves a rapid cycle of reacting hydrocarbon feedstock to form the overall product and then regenerating the catalyst used in the reaction. The reaction stage of the process can be carried out at relatively high liquid hourly space velocities, preferably at relatively low reforming pressure, and preferably at relatively low hydrogen to hydrocarbon ratios. The process can advantageously result in production of a relatively high octane gasoline product at relatively high total liquid yield. Relatively high quantities of hydrogen can also be produced, which can advantageously be used in other refinery processes (such as hydroprocessing) to provide higher quality liquid fuels having a relatively low content of sulfur-containing components. The liquid fuel product can be used as a gasoline blend stock, other liquid fuel blend stock, or directly as a fuel.

The process is particularly suited to cyclic reforming, with multiple reactors in series. Such a process can be carried out as a rapid cycle of reacting hydrocarbon feedstock to form the product and regenerating the catalyst used in the reaction, while the catalyst remains in the same reactor during hydrocarbon reforming and catalyst regeneration.

Feedstock

Feedstocks suitable for reforming according to this invention can include any hydrocarbon feedstocks boiling in the gasoline range. Non-limiting examples of such feedstocks can include, but are not limited to, hydrocarbons having initial and final ASTM boiling points in the range from about 20° C. to about 260° C., for example from about 50° C. to about 210° C. The basic test method of determining the boiling points or ranges of such feedstock, as well as the product compositions produced according to this invention, can be by performing batch distillation according to ASTM D86-09e1, Standard Test Method for Distillation of Petroleum Products at Atmospheric Pressure. Examples of such hydrocarbons having the preferred boiling point ranges can include, but are not limited to, straight-run naphthas, heavy virgin naphtha, natural gasoline, synthetic naphthas (such as coal- or oil-shale or oil-sand-derived naphtha), thermal gasoline, catalytically cracked gasoline, partially reformed naphthas, raffinates from extraction of aromatics, and the like, and mixtures thereof.

In one embodiment, the feedstock can have an initial boiling point in the range from about 20° C. to about 80° C. Additionally or alternately in this embodiment, the feedstock can have a final boiling point in the range from about 160° C. to about 210° C. In a particular embodiment, the feedstock can comprise a naphtha from a Middle East crude, which can preferably have a final boiling point in the range from about 100° C. to about 175° C.

The hydrocarbon feedstock injected into the reformer reactor and processed according to this invention can preferably have a relatively low sulfur content, e.g., not greater than 10 mass parts per million (ppm) on an elemental basis, for example not greater than 1 ppm or not greater than 0.1 ppm.

In one embodiment, the hydrocarbon feedstock can be pretreated to reduce sulfur content to a desired or predetermined sulfur content. Suitable means of pretreatment can include, but are not limited to, hydrotreating, hydrorefining hydrodesulfurization, and combinations thereof. In embodiments utilizing pretreatment processes, preferably a catalyst can be used that comprises an inorganic (oxide) support and at least one metal selected from Groups VIB and VIII of the Periodic Table of Elements (CAS version) capable of converting a variety of feedstock contaminants (such as sulfur-containing, nitrogen-containing, and/or oxygen-containing compounds into $H_2S$, $NH_3$, and $H_2O$, respectively). Such converted contaminants can then be separated out, with the remainder thus forming a particularly suitable feedstock. Separation can be accomplished by any appropriate means, such as by fractionation.

In another embodiment, the hydrocarbon feedstock can be pretreated to reduce sulfur content by contacting it with one or more sorbents capable of removing sulfurous (and optionally other) contaminants. Examples of such sorbents can include, but are not limited to, zinc oxide, iron sponge, high-surface-area sodium, high-surface-area alumina, nickel-on-alumina, activated carbons, molecular sieves, and the like, and combinations thereof.

In an embodiment, the feedstock can be a naphtha comprised of a combination of paraffins, olefins, naphthenes, and aromatics. In general, the naphtha feedstock can contain an overall olefins concentration not greater than about 60 wt %, for example not greater than about 50 wt %. Additionally or alternately, the naphtha feedstock can contain from about 4 wt % to about 40 wt % olefins, based on total weight of the feedstock. In some embodiments, the feedstock can be relatively high in aromatics content. For instance, in one embodiment, the feedstock can be a naphtha feedstock containing at least about 45 wt % aromatics, for example from about 50 wt % to about 90 wt % aromatics.

The feedstock can preferably be a liquid at standard temperature and pressure (STP) conditions. Also preferably, the feedstock can have an API gravity in the range from about 30 to about 45. API gravity can preferably be determined according to ASTM D3142-05, Standard Test Method for Specific Gravity, API Gravity, or Density of Cutback Asphalts by Hydrometer Method.

In one embodiment of the invention, the hydrocarbon feed can be hydrotreated before reforming, in order to reduce or remove impurities, e.g., heteroatoms such as nitrogen and sulfur. The presence of nitrogen, sulfur, and other impurities in the hydrocarbon feed can cause accelerated deactivation of the reforming catalyst.

Preferably, the feedstock can have a nitrogen concentration of not greater than about 2.0 wppm, for example not greater than about 1.0 wppm or not greater than about 0.5 wppm, based on total weight of the feedstock.

Hydrogen Addition

Hydrogen is typically generated during the reforming process. This invention provides, in particular, that relatively high quantities of hydrogen can be produced as a part of the overall reformed product. Due to the relatively high volume of hydrogen produced, the addition of hydrogen during reforming may be unnecessary. However, if desired, additional hydrogen can be added, though hydrogen addition can preferably be kept relatively low or to a minimum.

In a preferred embodiment, hydrogen and hydrocarbon feedstock can be injected into the reforming reactor at a (relatively) very low hydrogen to hydrocarbon mole ratio to produce the desired product. In one embodiment, the hydrogen to hydrocarbon mole ration can be not greater than about 1, preferably not greater than about 0.5.

When hydrogen is added, it can be added to the reactor separately from the feedstock, and/or it can be mixed with the feedstock. Any metering and/or monitoring device suitable for accurately determining and/or maintaining the desired hydrogen to hydrocarbon ratio can be used. In one embodiment, hydrogen concentration in an outlet stream of the reactor or an outlet stream fraction can be monitored by a hydrogen monitor, e.g., with a control valve setting position adjusted to maintain the desired hydrogen concentration. Hydrogen concentration can typically be calculated on the basis of total reactor effluent flow rates.

In one preferred embodiment, hydrogen can be provided as part of a stream generated through the separation of a portion of a light ends stream from the product stream from the reformer, as hydrogen will typically be formed during the reforming process. Alternately, hydrogen from other sources can be utilized.

Reactor

The feedstock can contact the reforming catalyst in upflow, downflow, or radial-flow mode. The catalyst can preferably be contained in a fixed bed reactor. A cyclic system employing at least one swing reactor can be particularly preferred. Such a system can preferably include individual fixed bed reactors that are serially isolated, preferably by manifolding arrangements such that, as the catalyst in a reactor becomes deactivated, the catalyst in the isolated reactor can be regenerated and reactivated while one or more other reactors remain on-stream.

A hybrid system containing the preferred cyclic system can also be used. Examples of such a hybrid system can include a semi-continuous regenerative unit containing fixed bed reactors, in which the unit can eventually be shut down for catalyst regeneration and reactivation, and a moving bed reactor in which catalyst can be continuously withdrawn from the reactor, regenerated, and returned.

Catalyst

Catalysts suitable for use herein can include both monofunctional and bifunctional catalysts. Monofunctional catalysts can typically include a hydrogenation-dehydrogenation function. Bifunctional catalysts can typically include both a hydrogenation-dehydrogenation function and an acid function.

The reforming catalyst includes at least one metal from Group VIII of the Periodic Table of Elements (CAS version). Group VIII metals suitable for use herein can include, but are not limited to, nickel, the noble metals (specifically platinum, palladium, iridium, ruthenium, rhodium, osmium, and combinations thereof), and combinations thereof. Preferred include the noble metals, particularly platinum. It is also preferred that the catalyst composition have a relatively high specific surface area, e.g., from about 100 $m^2$/g to about 400 $m^2$/g.

In a preferred embodiment, the Group VIII metal can be present on the catalyst in an amount from about 0.01 wt % to about 5 wt %, for example from about 0.1 wt % to about 2 wt %, calculated on an elemental basis, based on the total weight of the final catalytic composition.

In a particular embodiment of the invention, the reforming catalyst used in this invention can also contain at least one promoter metal from Group IIA (such as gallium), Group IVA (such as tin), Group IB (such as copper), Group VIB (such as chromium), and Group VIIB (such as rhenium). Preferably, the reforming catalyst can include one or more of rhenium and tin. The promoter metal can be present in the form of an oxide, sulfide, or elemental stage in an amount from about 0.01 wt % to about 5 wt % for example from about 0.1 wt % to about 3 wt % or from about 0.2 wt % to about 3 wt %, calculated on an elemental basis, based on the total weight of the final catalyst composition.

In one embodiment, the catalyst can comprise at least one halide component in an amount effective to provide acid functionality. Examples of such a halide component can include fluoride, chloride, iodide, bromide, or a combination thereof. Generally, the amount of halide is such that the final catalyst composition contains from about 0.1 wt % to about 3.5 wt %, for example from about 0.5 wt % to about 1.5 wt % of halogen calculated on an elemental basis.

The reforming catalyst can preferably include a support material, e.g., a refractory support, preferably such as a relatively high surface area material that is relatively uniform in composition without limited composition gradients. Examples of suitable supports can include, but are not limited to, one or more of (1) refractory inorganic oxides such as alumina, silica, titania, magnesia, zirconia, chromia, thoria, boria, or mixtures thereof; (2) synthetically prepared or naturally occurring clays and silicates; (3) crystalline zeolitic aluminosilicates, either naturally occurring or synthetically prepared, such as FAU, MEL, MFI, MOR, MTW (IUPAC Commission on Zeolite Nomenclature), in hydrogen form or in a form which has been exchanged with metal cations; (4) non-zeolitic molecular sieves; and (5) spinels such as $MgAl_2O_4$, $FeAl_2O_4$, $ZnAl_2O_4$, $CaAl_2O_4$.

In one embodiment, the support material can comprise or can be a crystalline silicate, also referred to as a silicate or zeolite. In this embodiment, the support can preferably be an intermediate or large pore zeolite. In general, such zeolites can have an average pore diameter of more than 5 Å, for example from about 5 Å to about 15 Å.

Examples of intermediate pore support materials suitable for use in this invention can include, but are not limited to, ZSM and CZH zeolites, e.g., ZSM-5, ZSM-11, ZSM-12, ZSM-22, ZSM-23, ZSM-35, ZSM-38, ZSM-48, CZH-5, and the like, and combinations thereof. Examples of large pore support materials suitable for use in this invention can include, but are not limited to, zeolite X, zeolite Y, zeolite L, faujasite, mordenite, and the like, and combinations thereof.

In one embodiment of the invention, the catalyst can include a structural support having an average particle diameter of not greater than about 500 microns, preferably not greater than about 300 microns, for example not greater than about 100 microns. Such a catalyst can be particularly advantageous in relatively high space velocity reaction processes, such as in the present invention. In a particularly preferred embodiment, the catalyst comprises platinum and one or more of rhenium and tin.

Space Velocity

The reforming reaction can preferably be carried out at a relatively high liquid hourly space velocity. Preferably, the LHSV of the reforming reaction can be greater than about 5 $hr^{-1}$, preferably greater than about 10 $hr^{-1}$, for example greater than about 20 $hr^{-1}$. Higher space velocities can be particularly beneficial to enhanced total liquid yield and hydrogen yield.

Reaction Time

In some embodiments, the reforming reaction can preferably be carried out as a part of a cyclic process in which the reforming catalyst is in a fixed bed reactor under predetermined conditions, followed by catalyst regeneration and reactivation. Total cycle time can be considered total time for a complete cycle in one fixed bed reactor, which includes the total of reaction time, regeneration time, and reactivation time for regenerated catalyst.

The reforming reaction can preferably be carried out by injecting hydrocarbon feedstock, and optionally but preferably hydrogen, into the reforming reactor to contact the reforming catalyst and to convert hydrocarbon in the feedstock into reformate or gasoline product. The contact can be carried out over a predetermined reaction time, e.g., the total reaction time per cycle being the time beginning at initial injection of hydrocarbon into the reactor and continuing until injection of the feedstock is ceased.

Since the reaction can preferably involve a relatively rapid cycle time, the injection of feedstock, and optionally the hydrogen, can be ceased after a time of not greater than about 100 hours, preferably not greater than about 50 hours, for example not greater than about 5 hours, not greater than about 1 hour, not greater than about 0.5 hours, or not greater than about 0.1 hours. In a particularly preferred embodiment, injection can be ceased at a time of not greater than about 10 minutes, for example not greater than about 5 minutes or not greater than 1 minute.

Reaction Temperature

The reaction process of this invention can be carried out at relatively high severity/temperature conditions. In a preferred embodiment, the process can be carried out at an Equivalent Isothermal Temperature (EIT) within the range from about 850° F. (about 454° C.) to about 1050° F. (about 566° C.), for example from about 900° F. (about 482° C.) to about 1000° F. (about 538° C.). According to this invention, EIT can be calculated as reactor inlet temperature at steady-state plus temperature change (ΔT) across the reactor, divided by two.

Reaction Pressure

It can be preferred to carry out the reforming reaction at a pressure that favors $C_{5+}$ yield. Lower pressures can therefore be favored. Preferably, the reaction can be carried out at a pressure not greater than about 100 psig (about 690 kPag), for example not greater than about 60 psig (about 410 kPag), not greater than about 40 psig (about 280 kPag), or not greater than about 20 psig (about 140 kPag).

Regeneration and Reactivation

The overall rapid cycle process can include catalyst regeneration and reactivation. At the beginning of the regeneration stage or procedure, the reactor containing the catalyst can typically be filled with hydrocarbon feedstock, aromatic products from dehydrocyclization reactions, and minor amounts of hydrogen and light hydrocarbons, as initially the reactor should typically be under the temperature and pressure conditions employed in the reaction procedure. Therefore, it may be appropriate to purge the catalyst bed, e.g., with hydrogen or a mixture of hydrogen and light hydrocarbons, in order to remove the feed and product hydrocarbons prior to catalyst regeneration. When a purge is done with the hydrogen and/or light hydrocarbon, in a preferred embodiment, the catalyst bed can be purged with a dry or wet, substantially inert gas (e.g., nitrogen).

In one embodiment, during one or both of the hydrogen purge and inert gas purge operations, the catalyst can be cooled to an appropriate initiation temperature for the coke burn cycle to follow. This cooling can be accomplished by regulating the temperature of the hydrogen, recycle gas, or inert gas admitted to the catalyst bed. In one embodiment, this initiation temperature can be not greater than about 900° F. (about 482° C.), for example not greater than about 850° F. (about 454° C.).

The coke burn step can be carried out by contacting the catalyst with an oxidizing (e.g., oxygen-containing) gas stream at a temperature from about 400° C. to about 600° C. for a period of time sufficient to burn coke off the deactivated catalyst and typically also to convert at least the Group VIII metal component into agglomerated particles. In one embodiment, regeneration can be carried out at an initial coke burn temperature of at least about 830° F. (about 433° C.), with the temperature preferably increasing up to a temperature from about 925° F. (about 496° C.) to about 975° F. (about 524° C.).

The decoked catalyst can then be reactivated, e.g., by contacting with hydrogen in a hydrogen reduction step to reduce the metal cation on the catalyst to the metallic state. Reduction may be carried out by contacting the catalyst with a mixture of hydrogen and an inert gas at a temperature in the range from about 350° C. to about 550° C.

In one embodiment, reactivation can be carried out by contacting the decoked catalyst with a gaseous stream comprising water, a source of chlorine, oxygen, and an inert gas under oxychlorination conditions, preferably including a temperature from about 450° C. to about 550° C. Additionally or alternately, the conditions can include a partial pressure of chlorine (derived from the source of chlorine) which is greater than about 0.03 psia (about 0.2 kPa) for a time sufficient to form oxyhalides of the metal.

In another embodiment, the chlorinated catalyst can be contacted with a gaseous stream containing water, oxygen, and an inert gas under chlorine removal conditions, preferably including a temperature from about 450° C. to about 550° C. Additionally or alternately, the conditions can include a time effective to lower the chlorine content of the catalyst to about 2 wt % or less.

In yet another embodiment, the catalyst of reduced chlorine content can be contacted with a gaseous stream containing an inert gas and hydrogen under reducing conditions, preferably including a temperature from about 450° C. to about 550° C. and a time effective to reduce metal in the catalyst to the metallic state.

When the reactivated catalyst is ready for re-use in the reforming process, the hydrocarbon feedstock and optionally hydrogen can again be injected into the reforming reactor and the reforming reaction re-continued.

The regeneration and reactivation steps can be carried out over a relatively short period of time in this rapid cycle time reaction process. Preferably, regeneration can be carried out for a period of time that is less than that of the reaction time, preferably not greater than about 50% of reaction time, for example not greater than about 25% of reaction time. Additionally or alternately, regeneration can be carried out for a period of time not greater than about 5 hours, preferably not greater than about 1 hour, for example not greater than about 0.5 hour or not greater than about 0.1 hour. In a particularly preferred embodiment, regeneration can be carried out for a period of time not greater than about 10 minutes, for example not greater than about 5 minutes or not greater than about 1 minute.

Reactivation of the catalyst can also be carried out relatively quickly. Preferably, reactivation can be carried out for a period of time less than that of the reaction time, and sometimes even less than that of regeneration. In a particular embodiment, reactivation can be carried out for a period of time not greater than about 2 hours, preferably not greater than about 1 hour, for example not greater than about 0.5 hour or not greater than about 0.1 hour. In a particularly preferred embodiment, reactivation can be carried out for a period of time not greater than about 10 minutes, for example not greater than about 5 minutes or not greater than about 1 minute.

Product

The gasoline or reformate product produced according to this invention can be used as a gasoline or fuel blend component or can be used directly as a fuel product. The gasoline product can advantageously be relatively high in research octane number (RON). Under the predetermined reaction conditions, the gasoline product can have an RON of at least 100, preferably at least 105, on a $C_{5+}$ basis.

Additionally or alternately, the gasoline or reformate product can also have a relatively low concentration of $C_1$ and $C_2$ components. Under the predetermined reforming conditions, the product can have a $[C_1+C_2]$ concentration of not greater than about 2 wt %, preferably not greater than about 1 wt %, on a total product weight basis.

Further additionally or alternately, the gasoline or reformate product can also have a relatively high benzene/toluene/xylene (BTX) concentration. Under the predetermined reforming conditions, the product can have a BTX concentration of at least about 28 wt %, preferably at least about 30 wt %, on a total weight basis.

Additionally or alternately, the reforming reaction can advantageously produce at least about an additional 200 scf/b (about 34 $Nm^3/m^3$) of hydrogen, for example at least about an additional 300 scf/b (about 51 $Nm^3/m^3$) of hydrogen, at least about an additional 350 scf/b (about 59 $Nm^3/m^3$) of hydrogen, at least about an additional 400 scf/b (about 68 $Nm^3/m^3$) of hydrogen, or at least about an additional 500 scf/b (about 85 $Nm^3/m^3$) of hydrogen, compared to a similar reforming process that does not employ rapid cycle technology. Further additionally or alternately, the reforming reaction can advantageously produce at least about 1350 scf/b (about 229 $Nm^3/m^3$) of hydrogen, for example at least about 1400 scf/b (about 237 $Nm^3/m^3$) of hydrogen, at least about 1500 scf/b (about 254 $Nm^3/m^3$) of hydrogen, at least about 1600 scf/b (about 271 $Nm^3/m^3$) of hydrogen, at least about 1700 scf/b (about 287 $Nm^3/m^3$) of hydrogen, or at least about 1800 scf/b (about 304 $Nm^3/m^3$) of hydrogen.

EXAMPLE

Computer simulations were performed to compare reforming under standard continuous catalytic reforming (CCR) conditions to reforming processes according to the invention. The simulations were based on pilot plant data. The feed rates were held constant and conditions adjusted to vary $C_{5+}$ product RON. The results of runs 1-4 are shown below in Tables A and B, with run 1 corresponding to standard CCR conditions and runs 2-4 corresponding to the process conditions within the parameters according to the invention.

TABLE A

Reaction Conditions and Parameters

| Run No. | Feed Rate (KBD) | LHSV ($hr^{-1}$) | EIT (°F.)/(°C.) | RON | Avg Rx Pressure (psig)/(kPa) | $H_2$ to HC Ratio (mol/mol) |
|---|---|---|---|---|---|---|
| 1 | 67 | 1 | 933/501 | 100 | 189/1300 | 4.5 |
| 2 | 67 | 10 | 934/501 | 100 | 59/410 | 1 |
| 3 | 67 | 10 | 980/527 | 105 | 59/410 | 1 |
| 4 | 67 | 10 | 978/526 | 106 | 59/410 | 0.3 |

TABLE B

Product Quality and Heat Duty

| Run No. | $C_{5+}$ Yield (wt %) | $H_2$ Production (SCF/B) | Total $C_1+C_2$ (wt %) | BTX Yield (wt %) | Overall Heat Duty (MMBTU/H) | Total Aromatic Yield (wt %) |
|---|---|---|---|---|---|---|
| 1 | 87.4 | 1160 | 3.18 | 31.1 | 321 | 65.4 |
| 2 | 89.7 | 1530 | 0.64 | 29.8 | 363 | 72.0 |
| 3 | 87.1 | 1740 | 0.98 | 33.8 | 409 | 78.0 |
| 4 | 87.1 | 1810 | 0.94 | 34.8 | 418 | 79.7 |

The data in Tables A and B show that the rapid cycle reforming process of this invention can result in a gasoline or reformate product that is relatively high in $C_{5+}$ yield, BTX yield, total aromatic yield, and $H_2$ production. At the same time, the product can be relatively low in ($C_1+C_2$) content, which low carbon number components tend to be less desirable in gasoline products.

The principles and modes of operation of this invention have been described above with reference to various exemplary and preferred embodiments. As understood by those of skill in the art, the overall invention, as defined by the claims, encompasses other preferred embodiments not specifically enumerated herein.

What is claimed is:

1. A reforming process for producing a gasoline product, comprising:
    injecting a hydrocarbon feedstock and hydrogen into a reforming reactor containing reforming catalyst at reforming conditions that include a liquid hourly space velocity of greater than about 10 $hr^{-1}$ and a hydrogen to hydrocarbon mole ratio of not greater than about 1 to produce a gasoline product;
    ceasing injection of the hydrocarbon feedstock and hydrogen into the reforming reactor at a time of not greater than about 5 hours;
    regenerating the catalyst in the reforming reactor once injection of the hydrocarbon feedstock and hydrogen have ceased; and
    continuing the injection of the hydrocarbon feedstock and hydrogen into the reforming reactor containing the regenerated catalyst at reforming conditions.

2. The method of claim 1, wherein the reforming conditions further include maintaining the reforming reactor at an average pressure of not greater than about 100 psig (about 690 kPag) during injection of the hydrocarbon feedstock and the hydrogen.

3. The method of claim 2, wherein the reforming conditions further including maintaining the reforming reactor at an average pressure of not greater than about 60 psig (about 410 kPag) during injection of the hydrocarbon feedstock and the hydrogen.

4. The method of claim 1, wherein the hydrogen to hydrocarbon mole ratio is not greater than about 0.5.

5. The method of claim 1, wherein a time for regenerating the catalyst is less than the time for ceasing injection of the hydrocarbon feedstock and hydrogen into the reforming reactor.

6. The method of claim 1, wherein the reforming process is a cyclic reforming process.

7. The method of claim 1, wherein the reforming reactor is a fixed bed reactor.

8. The method of claim 1, wherein the reforming catalyst includes a structural support having an average particle diameter of not greater than about 500 microns.

9. The method of claim 8, wherein the reforming catalyst comprises platinum and one or more of rhenium and tin.

10. The method of claim 1, wherein the reforming catalyst comprises a structural support comprised of alumina, silica, titania, magnesia, zirconia, chromia, thoria, boria, or a mixture thereof.

11. The method of claim 10, wherein the structural support comprises a crystalline silicate structural support.

12. The method of claim 1, wherein the hydrocarbon feedstock has both initial and final ASTM boiling points in the range from about 20° C. to about 260° C.

13. The method of claim 12, wherein the hydrocarbon feedstock is pretreated to reduce sulfur content.

14. A reforming process for producing a gasoline product, comprising:

injecting a hydrocarbon feedstock and hydrogen into a reforming reactor containing reforming catalyst at reforming conditions that include a liquid hourly space velocity of greater than 5 $hr^{-1}$ and a hydrogen to hydrocarbon mole ratio of not greater than about 0.5 to produce a gasoline product;

ceasing injection of the hydrocarbon feedstock and hydrogen into the reforming reactor at a time of not greater than about 5 hours;

regenerating the catalyst in the reforming reactor once injection of the hydrocarbon feedstock and hydrogen have ceased; and continuing the injection of the hydrocarbon feedstock and hydrogen into the reforming reactor containing the regenerated catalyst at reforming conditions.

15. The method of claim 14, wherein the reforming conditions further include maintaining the reforming reactor at an average pressure of not greater than about 100 psig (about 690 kPag) during injection of the hydrocarbon feedstock and the hydrogen.

16. The method of claim 14, wherein a time for regenerating the catalyst is less than the time for ceasing injection of the hydrocarbon feedstock and hydrogen into the reforming reactor.

17. The method of claim 14, wherein the reforming process is a cyclic reforming process.

18. The method of claim 14, wherein the reforming catalyst includes a structural support having an average particle diameter of not greater than about 500 microns, the structural support being comprised of alumina, silica, titania, magnesia, zirconia, chromia, thoria, boria, or a mixture thereof.

19. The method of claim 14, wherein the reforming catalyst comprises platinum and one or more of rhenium and tin.

20. The method of claim 14, wherein the hydrocarbon feedstock has both initial and final ASTM boiling points in the range from about 20° C. to about 260° C.

* * * * *